July 7, 1931.  W. L. KRAEMER ET AL  1,813,242
AIRPORT CLOSURE DEVICE
Filed March 13, 1929   3 Sheets-Sheet 1

Fig. 1.

INVENTOR
Waldo L. Kraemer
Joseph E. Garabrant
BY
ATTORNEY

July 7, 1931.  W. L. KRAEMER ET AL  1,813,242
AIRPORT CLOSURE DEVICE
Filed March 13, 1929  3 Sheets-Sheet 2
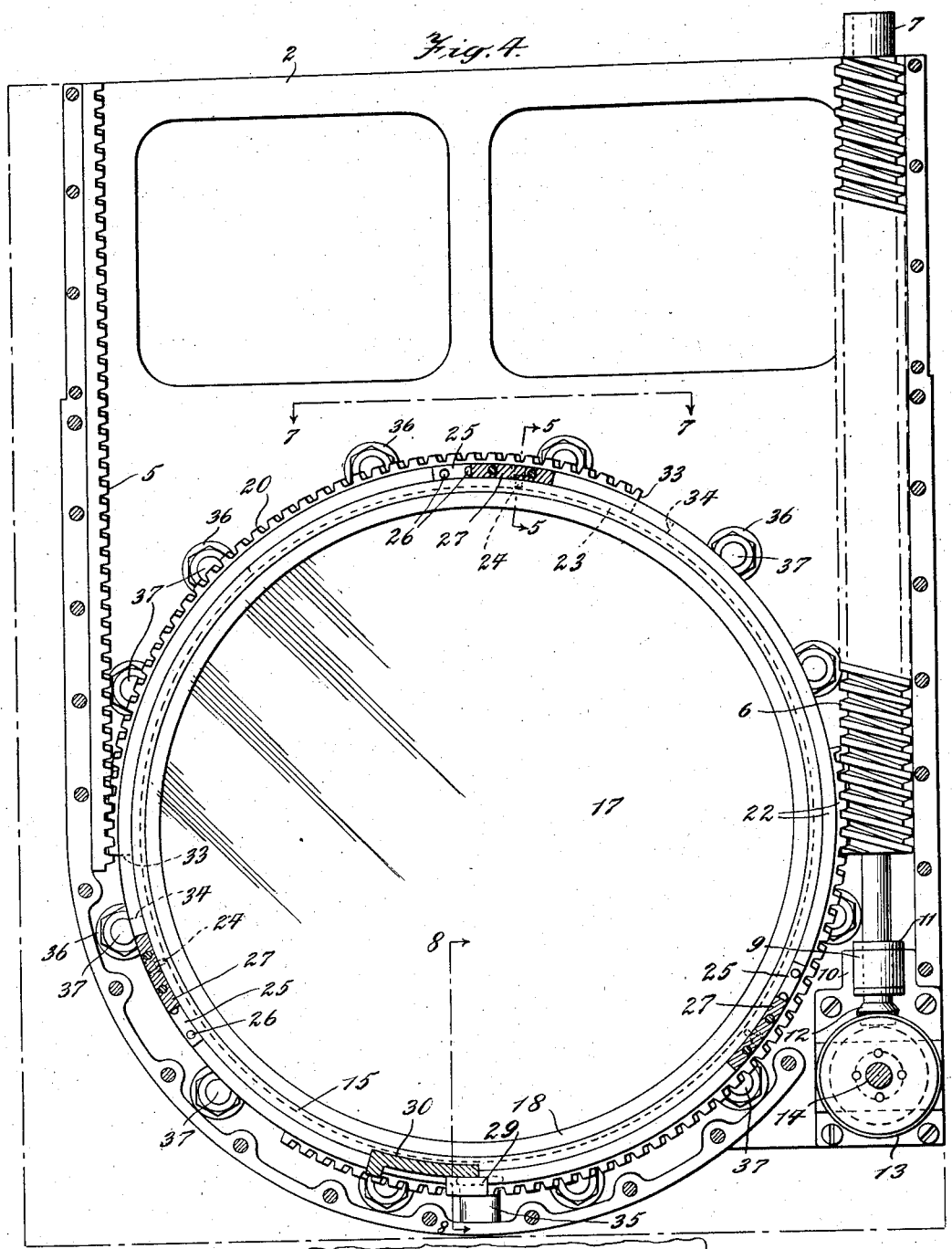
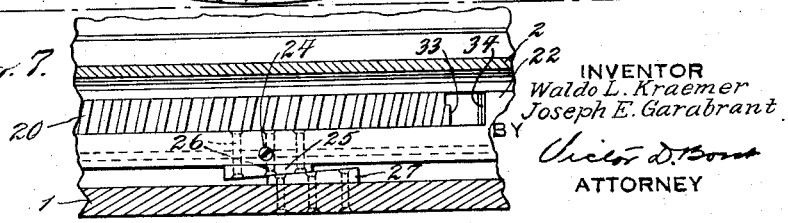
INVENTOR
Waldo L. Kraemer
Joseph E. Garabrant
BY
ATTORNEY

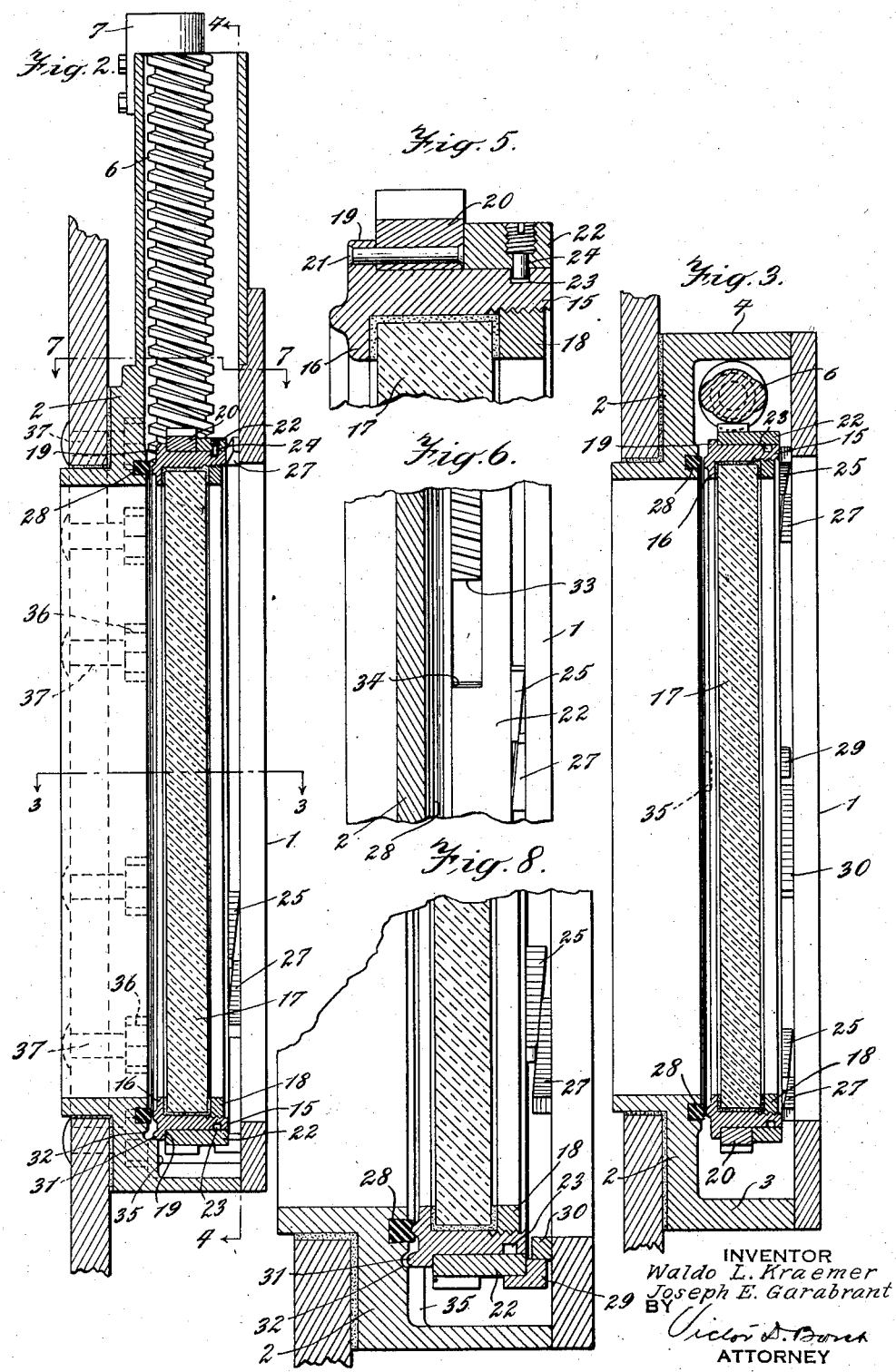

Patented July 7, 1931

1,813,242

UNITED STATES PATENT OFFICE

WALDO L. KRAEMER, OF BROOKLYN, NEW YORK, AND JOSEPH E. GARABRANT, OF MONTCLAIR, NEW JERSEY, ASSIGNORS TO KEARFOTT ENGINEERING COMPANY, INC., A CORPORATION OF NEW YORK

AIRPORT CLOSURE DEVICE

Application filed March 13, 1929. Serial No. 346,557.

This invention is particularly directed to a construction of an airport closure device. The invention contemplates a construction in which the airport closure member is moved along a path which contains the prolongation of a longitudinal axis of the closure member by positive actuating mechanism.

The invention is particularly adapted to the port holes of ships, wherein it is undesirable that the closure member, when in open position, protrude into the usually limited space of a stateroom as is the case with the commonly used hinged structures. Such hinged closures are also open to the objection that interior screens cannot be permanently attached in place and used therewith.

Attempts have been made to overcome these objections to swinging port hole closures by sliding the closure up and down in its casing to close and open the port, actuating the closure by cooperating racks and pinions but in such installations difficulty is encountered in obtaining the desirable weathertight seating of the closure member against the casing.

In accordance with our invention, we provide a closure device which is moved by a positive actuating mechanism along a continuation of its longitudinal axis. The closure device, according to our invention, is rotated about its transverse axis to roll upon its periphery as a bearing surface into or out of alignment with the airport. Upon the closure of the airport, a further movement of the actuating gear causes the engagement of strategically located opposed wedges which press the closure member against a seat provided therefor, thereby insuring a weathertight fit.

A detailed description of one embodiment of the invention will be given in connection with the accompanying drawings in which:

Fig. 1 is an elevation of the airport and closure member in alignment therewith having parts broken away to show the actuating mechanism;

Fig. 2 is a section on the line 2—2 of Figure 1;

Fig. 3 is a section on the line 3—3 of Figure 2;

Fig. 4 is a section on the line 4—4 of Figure 2;

Fig. 5 is a section on the line 5—5 of Figure 4;

Fig. 6 is a section on the line 6—6 of Figure 1;

Fig. 7 is a section on the line 7—7 of Figures 2 and 4, and

Fig. 8 is a section on the line 8—8 of Figure 4.

In the embodiment illustrated, we provide an airport casing comprising a front wall 1, a rear wall 2 and integral end walls 3 and 4 to which the front wall is secured by means of screws. A gear rack 5 is secured to and extends along the end wall 3. Adjacent the opposite end wall 4, a screw shaft 6 is journaled, at its upper end, in a bearing member 7 secured to the rear wall 2 by means of bolts 8. At its lower end, the screw shaft 6 is journaled in a bearing 9 provided in a gear casing 10. A flange 11 on the lower end of the screw shaft transmits the thrust on the screw shaft 6 to the gear casing 10 which constitutes a part of the end wall 4. On the lower end of the screw shaft which extends into the gear housing, a bevel gear 12 is secured thereto. The gear 12 meshes with a gear 13 secured to a horizontal shaft 14 journaled in the gear casing 10 perpendicular to the front and rear walls. The shaft 14 extends through the front wall 1, the extended portion having a substantially square socket therein. A handle having a projection to fit the socket portions of the shaft 14 is provided for rotating the shaft and, through the gears 12, 13, the screw shaft 6. The threads and teeth on the screw shaft 6 and the rack 5 respectively have a forward inclination the purpose of which will appear as the description proceeds.

Between the rack and screw shaft described immediately above, a port closure member is situated and comprises a circular frame 15 which has an inwardly extending shoulder 16 against which the glass 17 abuts. At the inner side, the frame 15 is internally threaded and a cooperating externally threaded ring 18 retains the glass 17 in position against the shoulder 16. On the outer periphery of the frame 15, there is a shoulder 19 to which a gear sector 20 of less width than the frame member is secured by means of transverse rivets 21. The gear 20 is adapted to engage the rack 5 secured to the end wall 3. A continuous ring 22 having a cutaway portion to accommodate the gear 20 is slidably mounted on the outer periphery of the frame. A groove 23 in the frame 15 engages set screw extensions 24 provided in the ring 22 and serve to prevent transverse movement of the ring while permitting circumferential movement. The cut away portion in the ring 22 is substantially longer than the gear sector 20, and constitutes a lost motion connection therewith, which permits the ring 22 to slide on the periphery of the frame 15 a distance equal to the difference between the length of the gear and the cutaway portion in the ring. On the outer peripheral surface of the ring 22, in an elevated section thereof which is substantially diametrically opposite to the gear sector 20, there is provided transverse threads adapted to engage the threads on the screw shaft 6. In the closed position of the closure member, strategically located wedges 25, secured to the side of the ring 22 by means of rivets 26, engage corresponding wedges 27 secured to the front wall 1, and press the closure member against a gasket 28 in the rear wall 2. On the lower portion of the ring a protruding piece 29, secured to the side thereof, cooperates with the overlapping piece 30 on the front wall to lock the closure member against vertical movement.

As hereinbefore mentioned, the teeth and threads on the rack 5 and screw shaft 6, respectively, are inclined downwardly toward the front or inner wall 1. The effect of this inclination is to produce, by the weight of the closure member acting on the inclined surfaces of the teeth, a resultant force having a horizontal component tending to shift the closure member away from the gasket 28 in the rear wall 2. Consequently, when the wedges 25, 27 are released, the closure member has a tendency to move away from the gasket 28 and thereby eliminate any unnecessary wearing of the gasket by frictional engagement with the moving closure member. In addition to the weight of the closure member which exerts an inwardly directed horizontal force moving the closure member away from the gasket, a positive means is also provided. A projection 31 on the frame 15, which in the closed position is received in a groove 32 in the rear wall 2, is provided to bear against the rear wall and positively move the frame 15 away from the gasket 28 as the frame 15 moves away from the closed position.

For the purpose of explaining the operation of the device, let us assume that the airport is closed as shown in the drawings in Figures 1, 2, 7 and 8. In this position, the closure member is supported by the ledge 35, the wedges 25 are in engagement with the wedges 27, the projection 29 is in engagement with the ledge 30, the frame 15 is pressed against the gasket 28, and the projection 31 is received in the groove 32. Looking at Figure 1, the shaft 14 may be turned to the right by means of a handle as hereinbefore explained. Through the gears 12 and 13, the screw shaft 6 is rotated to the left. The screw shaft by its engagement with the threads on the ring 22 exerts a tangentially upward force on the ring which rotates circumferentially about the frame of the closure member. The lost motion connection between the ring 22 and the gear sector 20 is sufficient to permit the ring to slide around the frame until the wedges 25 and 27 and the locking devices 29 and 30 are disengaged and the closure member, by the action of its weight on the inclined teeth, is moved away from the gasket 28. Further rotation of the ring 22 brings into engagement the end edges 33, 34 of the gear sector 20 and the ring 22 and rotates the closure member. As the closure member starts to rotate, the projection 31 moves out of the groove 32 and engages the rear wall 2. Further rotation of the closure member rolls it along the rack 5 up into the casing out of alignment with the airport into the open position. In closing the port, the reverse of the above takes place. The closure member follows the ring 22 until it rests upon the ledge 35 at the bottom of the casing. The ring, by virtue of its lost motion connection, continues to rotate about the closure member to engage the wedges 25, 27 to press the closure member against the gasket 28 and to bring the projection 29 under the ledge 30.

It is to be noted that when the closure member is in the open position the nuts 36 on the bolts 37 which secure the casing to the side of the ship are accessible and the entire structure may be attached to or removed from the side of the ship in the assembled form. Furthermore, in the closed position the port opening and the closure member are coaxial, and since the ring 18 has a diameter less than that of the port hole it may be removed and the glass 17 replaced without removing the front wall of the casing.

It is obvious that various changes may be made in the embodiment shown in the drawings and above particularly described within the principle and scope of our invention as expressed in the appended claims.

Claims:

1. In an airport construction, a casing, a rack rigidly secured to a wall of said casing, a closure member having a circular frame, gear teeth on said frame and adapted to engage said rack, means for rotating said frame about its center as an axis to roll the closure member along said rack, and means for firmly securing the closure member in the closed position.

2. In an airport construction, a casing comprising a side and end wall, wedges secured to the side wall, a closure member within said casing, a circular frame for said closure member having a portion of the periphery adapted to contact with the end wall, a continuous ring surrounding said frame, wedges secured to said ring and adapted to cooperate with the wedges on the side wall when the closure member covers the airport, means for rotating said ring, and a lost motion connection between said ring and said frame whereby said ring is rotated freely to release the wedge and then rotates with the frame to roll along the end wall.

3. In an airport construction, a casing comprising an outer wall having a gasket secured to the inner face thereof, a closure member adapted to be wedged against the gasket, a circular frame on said closure member having inwardly inclined teeth on the periphery thereof, and a rack on the end wall of said casing having inwardly and downwardly inclined teeth to engage said frame, the weight of the closure member acting on the inclined surface of the teeth tending to separate the closure member from the gasket.

4. In an airport construction, a casing comprising end and side walls, a projection on the inner surface of the outer side wall, a rack secured to an end wall, a closure member within said casing having a circular frame, a portion of the periphery of which is provided with gear teeth of less width than the frame member, and adapted to engage the rack, a continuous ring surrounding said frame, means for rotating said ring, a projection on said ring adapted to cooperate with the projection on the side wall when the closure member covers the port, and a lost motion connection with the frame, whereby rotation of the frame brings into engagement the said projections and positively moves the closure member away from the outer wall before engaging the frame thereof to roll the closure member along the rack.

5. In an airport construction, a casing, a rack rigidly secured to a wall thereof, a screw shaft journaled in the casing, a closure member having a circular frame, gear teeth on a portion of the periphery of said frame, and adapted to engage the rack, transverse threads cooperating with said frame and adapted to engage said screw shaft, means for rotating said screw shaft, and means including the screw shaft for securing the closure member in the closed position.

6. In an airport construction, a casing, a rack secured to an end wall thereof, a screw shaft journaled adjacent the opposite end wall, a closure member having a circular frame between said rack and said shaft, gear teeth on said frame, a continuous ring on said frame having a cutaway portion to receive said gear teeth, transverse threads on said ring adapted to engage said screw shaft, and means for rotating said screw shaft.

7. A closure member for an airport comprising a circular frame, elevated gear teeth on a portion of and of less width than the periphery of said frame, and a continuous circular ring on said frame having transverse threads on a portion of the outer periphery thereof, and a cutaway portion to receive said gear teeth, the cutaway portion being longer than said geared portion.

8. In an airport construction, a casing, wedges secured to the side wall thereof, a closure member within the casing, a circular frame for the closure member, a continuous ring surrounding the frame member, wedges secured to the ring adapted to cooperate with the wedges on the side wall when the closure member is in a closed position to force the closure member against the opposite side wall, means for rotating the ring to release the wedges and move the closure member longitudinally of the casing, a lost motion connection between the frame member and the ring, and means for preventing longitudinal movement of the ring during the take up of the lost motion and releasing of the wedges.

9. In an airport construction, a casing, wedges secured to the side wall thereof, a closure member within the casing, a circular frame for the closure member, a continuous ring surrounding the frame member, wedges secured to the ring adapted to cooperate with the wedges on the side wall when the closure member is in a closed position to force the closure member against the opposite side wall, means for rotating the ring to release the wedges and move the closure member longitudinally of the casing, a lost motion connection between the frame member and the ring, a projection on the ring, and a ledge on the side wall engaging the projection during the take up of the lost motion connection to prevent longitudinal movement of the ring prior to the releasing of the wedges.

10. In an airport construction, a casing having aligned openings in the side walls thereof, a circular closure member in said casing adapted to be moved into and out of alignment with said openings to close and open the airport, said closure member being biased toward the closed position, and means for rotating the closure member into and out of alignment with the openings in walls of the casing.

11. In an airport construction, a casing having aligned openings in the side walls thereof, a circular closure member in said casing adapted to be moved into and out of alignment with said openings to close and open the airport, said closure member being in alignment with the openings in the side walls of the casing in its lowermost position in the casing, and means for rotating the closure member into and out of alignment with the openings in the walls of the casing.

In witness whereof, we hereunto subscribe our signatures.

WALDO L. KRAEMER.
JOSEPH E. GARABRANT.